United States Patent [19]

Ikeda et al.

[11] 3,903,234

[45] Sept. 2, 1975

[54] PROCESS FOR PREPARING FILLED, BIAXIALLY ORIENTED, POLYMERIC FILM

[75] Inventors: Richard Masayoshi Ikeda, Chadds Ford, Pa.; George Joseph Ostapchenko, Wilmington, Del.

[73] Assignee: E. I. Du Pont de Nemours and Company, Wilmington, Del.

[22] Filed: Sept. 7, 1973

[21] Appl. No.: 395,250

Related U.S. Application Data

[60] Continuation-in-part of Ser. No. 328,635, Feb. 1, 1973, abandoned, which is a division of Ser. No. 157,367, June 28, 1971, Pat. No. 3,738,904.

[52] U.S. Cl............. 264/210 R; 260/41 A; 264/41; 264/211; 264/289; 264/DIG. 47
[51] Int. Cl................... B29d 27/00; B29d 7/24
[58] Field of Search ....... 264/210 R, 211, 41, 289, 264/45, DIG. 47; 161/402; 260/41 A, 41 B

[56] References Cited
UNITED STATES PATENTS

| | | | |
|---|---|---|---|
| 3,154,461 | 10/1964 | Johnson | 161/116 |
| 3,309,452 | 3/1967 | Yumoto et al. | 264/284 |
| 3,637,906 | 1/1972 | Parathoën | 260/857 L |
| 3,639,554 | 2/1972 | Hutt | 264/95 |
| 3,694,399 | 9/1972 | Schwarz | 260/41 B |
| 3,697,475 | 10/1972 | Morris et al. | 260/41 A |
| 3,725,520 | 4/1973 | Suzuki et al. | 264/41 |
| 3,741,841 | 6/1973 | Toyoda et al. | 161/402 |
| 3,758,661 | 9/1973 | Yamamoto et al. | 264/289 |
| 3,765,999 | 10/1973 | Toyoda | 264/210 R |
| 3,773,608 | 11/1973 | Yoshimura et al. | 161/168 |

*Primary Examiner*—Jeffery R. Thurlow

[57] ABSTRACT

A process for preparing a thermoplastic film having a void content of at least about 30 to 70%, a fibrous surface having about 2 to 40 surface ruptures per square millimeter, and an oxygen permeability of about 900 to 10,000,000 cc./100 sq.in./24 hrs./atmosphere/mil by:

1. melt-blending a $C_2$–$C_{10}$ α-monoolefin polymer and about 26 to 50 weight percent inert filler, based on the total weight of polymer and filler;
2. forming a film from the melt blend;
3. cooling the film to a temperature below the melting point;
4. stretching the film at least about twice its original forming dimensions in mutually perpendicular directions while the film temperature is above the line-drawing temperature and below the polymer melting temperature until the film has at least about 30% voids; and
5. cooling the film to room temperature.

5 Claims, 3 Drawing Figures

PATENTED SEP 2 1975 3,903,234

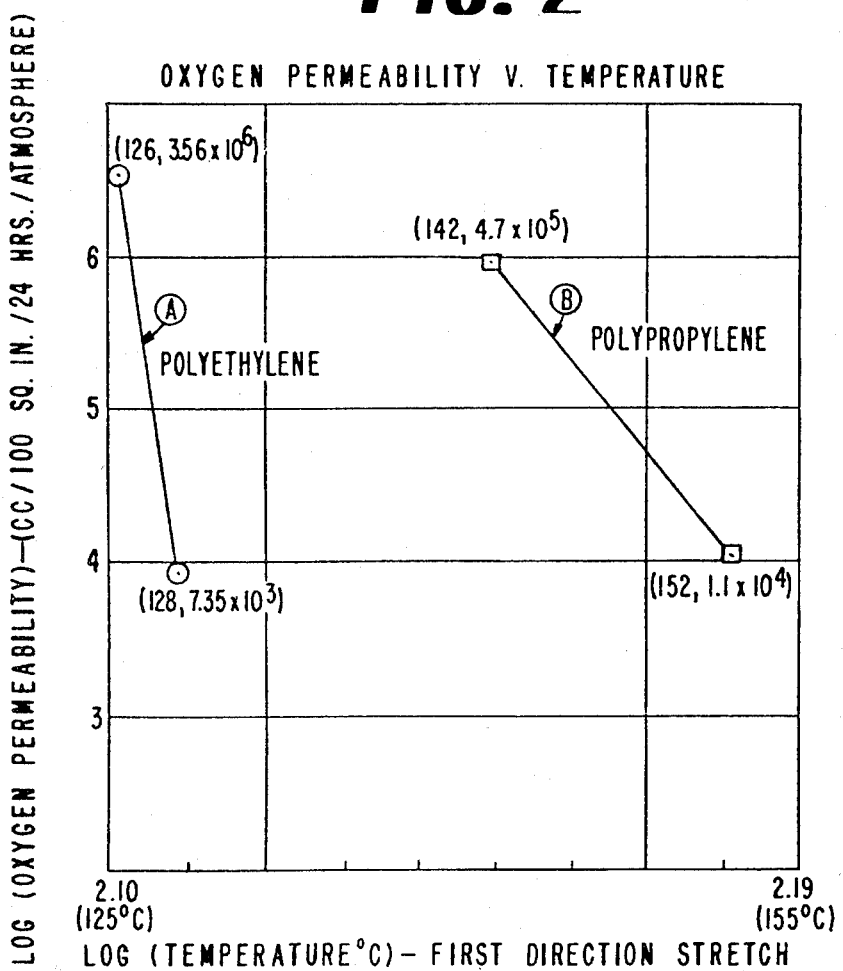

PROCESS FOR PREPARING FILLED, BIAXIALLY ORIENTED, POLYMERIC FILM

CROSS REFERENCE TO RELATED APPLICATIONS

This application is a continuation-in-part of application Ser. No. 328,635, filed Feb. 1, 1973 now abandoned, which in turn is a division of application Ser. No. 157,367, filed June 28, 1971, now U.S. Pat. No. 3,738,904.

BACKGROUND OF THE INVENTION

This invention relates to a biaxially stretched polymeric film having an inert filler dispersed therein and a process for preparing such a film. The film is generally characterized as having a relatively low density, good elongation, a controllable porosity and a controllable amount of surface ruptures. Such a film has an excellent versatility in use closely related to the degree of porosity and the number of surface ruptures. Uses include synthetic writing paper to an ultra filter.

It is known in the art that thermoplastic polymers can be filled with inert fillers, cast into films, and thereafter stretched to form an oriented thermoplastic film. While this general statement is true, it must be appreciated that the particular ingredients used and the particular process and process parameters employed when varied, can result in significantly different end products or significantly contribute to the success or failure of obtaining a desired result. In addition, many articles formed from such known thermoplastic filled polymers have enjoyed excellent commercial acceptance; therefore, there is a continuous effort made to discover new and related competitive products.

SUMMARY OF THE INVENTION

Accordingly, the present invention provides a new and useful thermoplastic film and a process for making it.

The film is a biaxially stretched polymeric matrix having a filler dispersed therein and is characterized as having a density of about 0.3 to 0.7 g./cc., an elongation at break at 22°C. of at least about 8% in either direction of stretch, an oxygen permeability of about 900 to 10,000,000 cc./100 sq. in./24 hrs./atmosphere/mil and about 2 to 40 surface ruptures per square millimeter.

The process for preparing the thermoplastic film consists essentially of:
1. melt-blending
   a. a polymer taken from the group consisting of homopolymers, copolymers, or blends thereof of α-monoolefins having two to ten carbon atoms, said polymer having a crystallinity of at least about 60% at room temperature; and
   b. about 26 to 50 weight percent of an inert filler based on the weight of the polymer and filler, said filler having an average particle size of about 0.3 to 8 microns;
   wherein the blend has an elongation at break of at least 1000% at a temperature within the range which is above the line-drawing temperature and below the melting temperature of the polymer;
2. forming a film from the melt blend;
3. cooling the film to a temperature below the melting point;
4. biaxially stretching the film at least about two times its original forming dimensions in mutually perpendicular directions with the temperature of the film during stretching within the temperature range which is above the line-drawing temperature and below the melting temperature of the polymer, until the film has at least about 30% voids;
5. cooling the film to room temperature.

When using sequential stretching, the preferred method of stretching, the oxygen permeability in the final film product is directly related to the temperature of the film during the first stretching operation in accordance with the following equation, and therefore the desired oxygen permeability can be obtained by adjusting this temperature accordingly:

$$\text{Log } P = C_1 \text{ Log } T + C_2$$

where:

$P$ = oxygen permeability of the final film product,
$C_1$ }
$C_2$ } = experimentally determined constants related to film composition and process parameters used to make the film, and
$T$ = temperature of the film during the first direction stretch.

BRIEF DESCRIPTION OF THE DRAWINGS

FIG. 2 a plot of test results measuring oxygen permeability against temperature during the first stretching operation and FIG. 3 a side elevation view depicting a preferred process for preparing films of the present invention.

DESCRIPTION OF THE INVENTION

Figure 1:
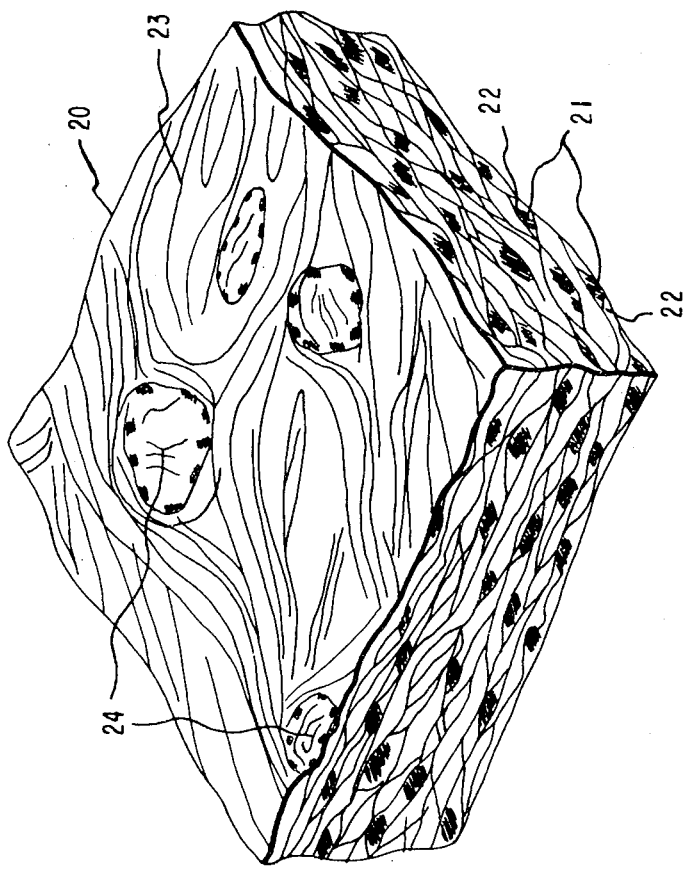
FIG. 1 is a prespective view of the film of this invention.

Referring to FIG. 1, thermoplastic films of the present invention are comprised of a polymer matrix 20 having dispersed therein an inert particulate filler 21 surrounded by voids 22. The surface is characterized by its fibrous texture 23 and surface ruptures 24.

More particularly, the film consists of a polymer from the group consisting of homopolymers, copolymers and blends thereof of α-monoolefins having two to ten carbon atoms with a crystallinity of at least 60% at 22°C. having dispersed therein 26 to 50 weight percent of an inert filler, based on the total weight of polymer and inert filler, having a particle size of about 0.3 to 8 microns.

The film has a density of about 0.3 to 0.7 g./cc., an elongation at break of at least 8% in either direction of stretch at 22°C., an oxygen permeability of 900 to 10,000,000 cc./100 sq.in./24 hrs./atmosphere/mil and about 2 to 40 surface ruptures per square millimeter. In addition, the film has about 30 to 70% voids, and films can be made having a TAPPI opacity of at least about 85%. Films of the present invention are generally made having a final thickness of about 0.5 to 7.0 mils.

Other properties of the film such as burst strength, stiffness and modulus of elasticity vary according to the type of polymer and filler used. For example, a film having a thickness of about 4.3 mils prepared according to a preferred embodiment incorporating a copolymer matrix of about 98/2 weight percent units of ethylene/octene with a density of 0.956 g./cc. and a crystallinity of about 71% at 22°C. and about 35 weight percent calcined kaolin clay, having an average particle size of 5.5 microns are further characterized as having a Mullen burst strength of at least about 40 lbs., a Clark stiffness of at least about 15 and a modulus of elasticity of at least about 126 Kpsi. While another preferred film having a thickness of about 3.6 mils prepared incorporating polypropylene having a crystallinity of about 71% at 22°C. as a matrix with the same calcined kaolin clay dispersed therein exhibits properties characterized as a Mullen burst strength of at least about 40 pounds, a Clark stiffness of at least about 20 and a modulus of elasticity of about 115 Kpsi in either direction of stretch.

Various tests used to determine the properties and characteristics of the films of this invention are discussed below.

1. The density is measured by ASTM D 792-64T which provides a weight per unit volume based on the boundary dimensions of the specimen.

2. The tear propagation strength is measured by ASTM D-1922, wherein a specimen is notched and a tear propagating from the notch is made and the force required to progagate the tear is measured.

3. The elongation at break, modulus of elasticity, and tensile strength at room temperature, i.e., about 22°C., are measured by ASTM D-882.

4. The elongation at elevated temperatures is measured by an Instron Oven test wherein a rectangular specimen is prepared that is one inch wide and four inches long along the two longer sides. The specimen is punched on both sides, at the center of the long dimension with a McBee Punch, type 5227-643, leaving a narrow center section having a length of about 0.150 inch. The specimen is gripped and pulled at the rate of five inches per minute permitting the sample to stretch in its long dimension.

The elongation is measured in percent according to the following equation:

$$E = \frac{L_F - L_0}{L_0} \times 100$$

where:
$E$ = % elongation,
$L_F$ = length of specimen's effective gauge length at break,
$L_0$ = original gauge length of specimen.

Thickness measurements are made in accordance with ASTM D-374.

5. Tear initiation strength is measured by ASTM D-1004.

6. TAPPI (Technical Association of Pulp and Paper Industry) Stiffness, sometimes referred to as Clark Stiffness, is measured by TAPPI test T-451.

7. Opacity is measured by TAPPI test T-425.

8. TAPPI burst strength, sometimes referred to as Mullen Burst, is measured by TAPPI test T-403.

9. Percent voids is determined by the following equation:

$$\% \text{ Voids} = 100 - \left(\frac{\text{density of stretched film}}{\text{density of film before stretching}}\right) \times 100$$

10. The number and size of the surface ruptures can be measured by metallizing the film with aluminum at an angle normal to the film surface, transmitting light through the film perpendicular to the film, then counting the number and measuring the size of the light spots shining through the film.

11. The oxygen permeability is measured by ASTM D-1434.

The films prepared according to the present invention have excellent versatility in use. For example, increasing the amount of surface ruptures improves the ink receptivity of the film, making the film useful for writing or printing paper. Since the porosity of the film can be controlled, film having a maximum oxygen permeability can be made that is useful as a filter or as a substrate for an ion exchange membrane. With oxygen permeability at a minimum, the film is practically waterproof having an excellent barrier surface while maintaining the ability to receive ink on the surface for printing and labeling and can, therefore, be used for packaging material. With porosity at a maximum and the film containing a maximum amount of filler, the film is very inexpensive and can, therefore, be used as a "paper bag" to carry groceries. The film also has use in the manufacture of electrical capacitors.

In addition, the films can be coated for various purposes such as providing an improvement in the printability of the paper, i.e., ink receptivity, fidelity, brightness, contrast or can be coated to reduce static in paper. Coating adhesion is facilitated by the surface ruptures although the film can optionally be surface treated before coating by conventional means such as electrical discharge, flame treatment, acid treatment, or by the use of various oxidants such as peroxide. It must be realized, of course, that the coating must contain a binder that is selected for its preferential adhesion to base material.

Following is a description of the process used to make the film products of the present invention.

The film products of the present invention are prepared from a polymer having dispersed therein an inert filler. Useful polymers include homopolymers, copolymers or blends thereof of $\alpha$-monoolefins having two to ten carbon atoms wherein the polymer has a crystallinity of at least about 60% at room temperature.

Representatives examples of useful homopolymers include the homopolymers such as polyethylene, polypropylene, poly(1-butene), poly(3-methyl-1-butene), poly(3-methyl-1-pentene), poly(4-methyl-1-pentene), poly(4,4-dimethyl-1-pentene), poly(3-methyl-1-hexene), poly(4-methyl-1-hexene), and poly(4,4-dimethyl-1-hexene).

Useful copolymers include ethylene/propylene, ethylene/1-butene, ethylene/1-pentene, ethylene/1-hexene, ethylene/1-octene, ethylene/1-heptene, ethylene/1-nonene, and ethylene/1-decene.

Useful blends thereof include blends of homopolymers such as polyethylene and polypropylene or blends of a homopolymer and a copolymer such as polyethylene blended with ethylene/octene or ethylene/decene. Blends of two copolymers such as ethylene/1-octene and ethylene/1-butene can also be used provided they have a crystallinity of at least about 60% at room temperature.

The crystallinity of a polymer is difficult to measure directly, therefore, it has become conventional to use an indirect method of measuring crystallinity. One such method is described in *Physical Chemistry of Macromolecules*, authored by C. Tanford, published by John Wiley and Sons (1961) at page 125. The method described therein is based on the fact that the crystallinity of the polymer is related to the density of the polymer and, accordingly, a chart has been prepared correlating density to crystallinity. Therefore, it is only necessary to measure the density of a polymer by conventional means, refer to the type of chart in *Physical Chemistry of Macromolecules* referenced above, and pick out the crystallinity of the polymer. Density of the polymer can be measured by ASTM D-792-64-T.

Useful fillers can be organic or inorganic. They must be relatively inert toward the polymer, have a relatively low interfacial surface tension making it practically noncohesive toward the polymer matrix, have an average particle size of about 0.3 to 8 microns and be present in the amount of about 26 to 50 weight percent based on the total amount of polymer and filler present. Average particle size of a filler material is determined by having 50% by weight of the filler pass through a sieve having openings the size of the average particle size designation.

If the particles have an average size less than about 0.3 micron, few or no voids result. If the average particle size is greater than 8 microns, large and fewer voids than desirable form which do not provide the desired low density. The amount of filler present is based primarily on practicalities; however, it has been found that there should be at least about 26 weight percent to provide sufficient nucleation centers for voiding but no greater than about 50 weight percent in order to provide a film flexible enough to handle. If the amount of filler is significantly greater than 50 percent, the film becomes weak and tends to crack and tear easily.

Useful inert, inorganic fillers include silica, diatomaceous earth, titanium dioxide and clays while useful organic fillers include nylon, polyesters and polyamides, provided they are below their softening temperature at the stretching temperature of the film and are in the disclosed particle size range. A preferred filler is kaolin clay, commercially available as "Alumex R," "Hi-White R," "Macnamee Clay," "Paragon Clay," "Poly-Fil," or "Engelhard-ASP 400."

When using the preferred filler, i.e., clay, it has been helpful to calcine the clay prior to its incorporation into the polymer. It is believed that calcined clay has a lower adhesive bond to the polymer then uncalcined clay and, therefore, during stretching, polymer easily pulls away from the calcined clay providing an increased number of open cells or voids for a given stretch ratio thereby assisting in decreasing the density of the film. Typically, when using calcined clay, the percent increase in the number of voids is about 30 to 45% compared to the number of voids obtained using an uncalcined clay. This amounts to an increase of about 20 to 25% in opacity.

The inert filler is dispersed within the polymer and this can be accomplished by conventional means such as meltblending. blending. The polymer-filler composition must have an elongation of at least 1000% at a temperature within the range of about the line-drawing temperature and the melting temperature of the polymer. The line-drawing temperature and the melting temperature of a useful polymer can be determined experimentally.

The line-drawing temperature is defined in the following manner: When a polyolefin film is stretched at temperatures low enough for line drawing, a "line" or "neck" develops in the film perpendicular to the direction of stretch once the yield point is reached. Stretching then emanates from this thinned out region until an elongation equal to the natural draw ratio of the polyolefin is achieved for the particular stretch rate used. If a series of polyolefin film samples is stretched under conditions of line-drawing at a set of increasingly higher temperatures (starting from room temperature, e.g.), a series of decreasingly sharp maxima will result in the corresponding stress-strain curves. At some higher temperature, a maximum no longer appears in the stress-strain curve, and line-drawing has ceased. At this temperature or higher temperatures, the film undergoes more uniform stretching over its length and no longer displays a line or neck during elongation. For more detailed discussions of line-drawing, refer to U.S. Pat. No. 2,961,711; U.S. Pat. No. 3,057,835; and "Polyethylene" by Renfrew and Morgan, 2nd Edition, pages 170–172, published by Interscience Publishers, Inc., New York (1960).

A significant fact related to the line-drawing temperature of a film is that the line-drawing temperature can change. For example, a film has a given line-drawing temperature before stretching. However, after stretching in one direction, i.e., uniaxial stretching, the line-drawing temperature of the film in the direction perpendicular to the uniaxial stretch is higher than the given temperature. This fact must be taken into consideration in order to provide biaxial stretching at the proper stretching temperature.

The melting point can be experimentally determined by heating a polymer and noting the temperature of disappearance of the last trace of crystallinity as evidenced by birefrigence observed between crossed polarizers on a hot-stage microscope. Further information related to a definition of the melting point can be obtained from "Textbook of Polymer Science" by F. W. Billmeyer, Jr., Interscience Publishers, Inc., New York, page 158 (1962).

In addition to the polymer and filler, the film-forming composition can contain other additives which do not adversely affect the resultant product such as pigments, dyes and antistatic agents.

After the film composition is prepared, it is formed into a film by conventional film-forming equipment. Thereafter, it is biaxially oriented by stretching either simultaneously or sequentially at least about two times, and preferably three to seven times, its original film-forming dimensions in mutually perpendicular directions at a temperature which is above the line-drawing temperature and below the melting temperature of the polymer (where the polymer-filler composition has an elongation at break of at least 1000%), until the film contains at least about 30% voids and preferably about 40 to 70% voids.

Biaxial stretching of the film from its original forming dimensions is important for at least the following reasons:

Stretching breaches the bond between the polymer matrix and the inert filler creating voids in the polymer matrix and a fibrous surface with ruptures on the surface of the film. Increasing the stretch ratio within the limits described above increases the number of voids in the polymer matrix causing an increase in the opacity of the film and a decrease in the density. In addition, biaxial stretching balances the tear strength of the film.

It has been found that sequential biaxial stretching, i.e., stretching in one direction first, usually the machine direction (MD) of the film at one temperature following by transverse direction (TD) stretching of the film at a higher stretch temperature, is advantageous to obtaining an end product that has a relatively high oxygen permeability. Simultaneous stretching or rapid sequential stretching at one uniform temperature on the other hand, results in equivalent density films with relatively lower oxygen permeability.

The stretch ratio of at least two times the original forming dimensions is significant to producing a film having at least 30% voids resulting in relatively high density films. However, to produce relatively low density films, it is preferred that the film be stretched at least three to seven times its original forming dimensions in mutually perpendicular direction, resulting in a film having about 40 to 70% voids.

While the degree of stretch is significant to providing voids, the degree of voiding is also closely related to the filler content and size. It has been found that the higher the filler content or the smaller the particle size, within the ranges specified by the invention, the greater the degree of voiding. Oxygen permeability, on the other hand, is related to the number and size of voids. It has been found that increasing the amount of filler, or increasing the filler size, will result in increased oxygen permeability.

In sequential stretching, where the first and second stretching operations are carried out at different temperatures, the conditions during first direction of stretch are very important because they greatly influence the degree of oxygen permeability in the film structure and the amount of surface ruptures for a given filler type and content.

The oxygen permeability for a given filler loading in the end product can be approximated by a hyperbolic relationship to the temperature of the film during the first direction of stretch by the following formula:

EQUATION 1

$$\text{Log } P = C_1 \log T + C_2$$

where:

P = oxygen permeability in the final film product,
$C_1$ } = experimentally determined constants related to film composition and process parameters used to make the film,
$C_2$
T = temperature of the film during the first stretching operation.

This equation was derived by preparing film samples according to the present invention, varying the temperature of the film during the first direction stretch, measuring the resultant oxygen permeability of the end film product, plotting a log-log curve of the oxygen permeability v. temperature and determining the equation of the curve by known mathematical means which indicate that the curve is a hyperbola. FIG. 2 shows such a curve for polyethylene and polypropylene. The polyethylene has a density = 0.965 g./cc., a crystallinity of about 71% and a melt index of 0.45 having dispersed therein about 35 weight percent of calcined kaolin clay stretched about 4.5 times in the machine direction, cooled and reheated to 128°C., then stretched about 5.5 times in the transverse direction and cooled at room temperature. The results of measuring oxygen permeability and temperature are plotted and indicated as plot "A".

The polypropylene has a density of about 0.910 g./cc. and a crystallinity of about 71% having dispersed therein about 35 weight percent of calcined clay stretched 4.5 times in one direction at 146°–147°C., cooled to room temperature and reheated to 161°C., then stretched 5.5 times in a mutually perpendicular direction and cooled to room temperature. The test results of measuring oxygen permeability against temperature during the first stretching operation are plotted and indicated as plot "B" in FIG. 2.

The constants $C_1$ and $C_2$ in Equation 1 are derived in the following manner. For a given polymer-filler composition, a film is prepared according to the process of the present invention wherein a temperature $T_1$ is chosen for use within the range of about the polymer line-drawing temperature to the polymer-melting temperature. After the film is prepared, the oxygen permeability $P_1$ is measured by conventional gas permeation techniques. Thereafter, a second film is prepared in the same manner except that the temperature used during the first direction of stretch is changed to $T_2$ and the oxygen permeability $P_2$ of the final film product is measured. Knowing the oxygen permeability for two films prepared using two different temperatures during the first direction of stretch and the fact that the oxygen permeability and temperature are hyperbolically related, the following linear equations are solved simultaneously:

Equation 2    $\log P_1 = C_1 \log T_1 + C_2$
Equation 3    $\log P_2 = C_1 \log T_2 + C_2$ Simultaneous solution of Equations 1 and 2

$$C_1 = \frac{\log P_1 - \log P_2}{\log T_1 - \log T_2}$$

$$C_2 = \log P_1 - \log T_1 \left( \frac{\log P_1 - \log P_2}{\log T_1 - \log T_2} \right)$$

For the film sample of polyethylene that is plotted in FIG. 2, constants $C_1$ and $C_2$ can be determined based on the following data where oxygen permeability ($P_1$ and $P_2$) is measured in cc./100 sq., in./24 hrs./atmosphere and temperature ($T_1$ and $T_2$) is in °C. $P_1 = 3.56 \times 10^6$, $\log P_1 = 6.551$, $T_1 = 126$, $\log T_1 = 2.10037$; $P_2 = 6.43 \times 10^5$, $\log P_2 = 5.808$, $T_2 = 127$, $\log T_2 = 2.10380$ $$C_1 = \frac{6.551 - 5.808}{2.10037 - 2.10380}$$

$$C_1 = -217$$

$$C_2 = 6.551 - 2.100 \left( \frac{6.551 - 5.808}{2.10037 - 2.10380} \right)$$

$$C_2 = 462.$$

Therefore, the equation for determining the oxygen permeability of this polyethylene-filled composition is:

$$\text{Log } P = -217 \log T + 462$$

Actual oxygen permeability can be checked against this equation be determining the oxygen permeability of the film according to ASTM D-1434.

In addition to controlling the degree of oxygen permeability by controlling the film temperature during the first direction stretch, a differential oxygen permeability can be created through the film by differentially cooling or heating the surfaces of the film after casting and before the first direction stretch. The cooler the film surface, the higher the oxygen permeability through that surface will be. This differential oxygen permeability is made evident by placing a few drops of isopropyl alcohol on the two surfaces of a film that has been differentially cooled or heated and observing the relative permeability rates. The surface that receives the most heating or least cooling is permeated very slowly or not at all while the surface receiving the least heating or greatest amount of cooling is easily permeated.

While the degree of oxygen permeability can be determined and controlled in accordance with the relationship of Equation 1 above, it has been found that oxygen permeability is sensitive to change only over a given temperature range. Therefore, while films can be made according to the present invention wherein the stretching operation and, in particular, the first stretching operation can be effectively carried out at a temperature between about the line-drawing temperature and the melting temperature of the polymer, it is only at some given temperature range within this broad range that the oxygen permeability can actually be changed by changing the temperature of the first stretching operation.

For example, the line-drawing temperature for a filled polyethylene useful in preparing film of the present invention is about 121°C. and the polymer-melting temperature is about 131°C., so that films can be made according to the present invention with the temperatures of the first streching operation anywhere from about 121° to 131°C. However, significant changes in oxygen permeability can only be evidenced over the temperature range of about 126°–128°C. during the first stretching operation with the temperature of the film during the second direction stretch somewhat higher. When the first stretching operation is carried out at a temperature between 121°C. and 126°C., maximum oxygen permeability is obtained and when the temperature is 128°C. to 131°C., minimum oxygen permeability is obtained. The particular temperature range where the film is most sensitive to substantial changes in oxygen permeability can be determined experimentally for other films.

The first stretching operation is also very important in determining the amount and size of surface ruptures. It has been found that the surface ruptures can have a size variance from about 10 to 300 microns in their maximum dimension measured in a plane parallel to the surface of the film and number about 2 to 40 ruptures per square millimeter. The number of surface ruptures increases as the temperature of the film decreases during the first stretching operation. The fibrous surface along with the surface ruptures provides an excellent ink-receptive surface.

The second direction of stretch, whether carried out sequentially or simultaneously, is particularly important to (a) balance the properties of the film such as tear strength and elongation, (b) provide a significant increase in voiding compared to the voids created during the first direction stretch. The elongation of at least 8% at 22°C. provides a film having adequate toughness and impact strength making it useful for packaging where impact loading can occur. It has been found that the percent elongation decreases as the stretch ratio in the second direction of stretch increases. A relatively high stretch ratio produces relatively high voiding resulting in a low elongation. Therefore, a relatively high stretch ratio must be balanced against the loss in elongation in order to provide at least an 8% elongation at 22°C.

After the film is biaxially oriented, the film can optionally be heat-set, then cooled to room temperature and wound on a winding roll.

A preferred process for preparing the thermoplastic films of the present invention will now be described in relation to the accompanying drawings.

Figure 3:
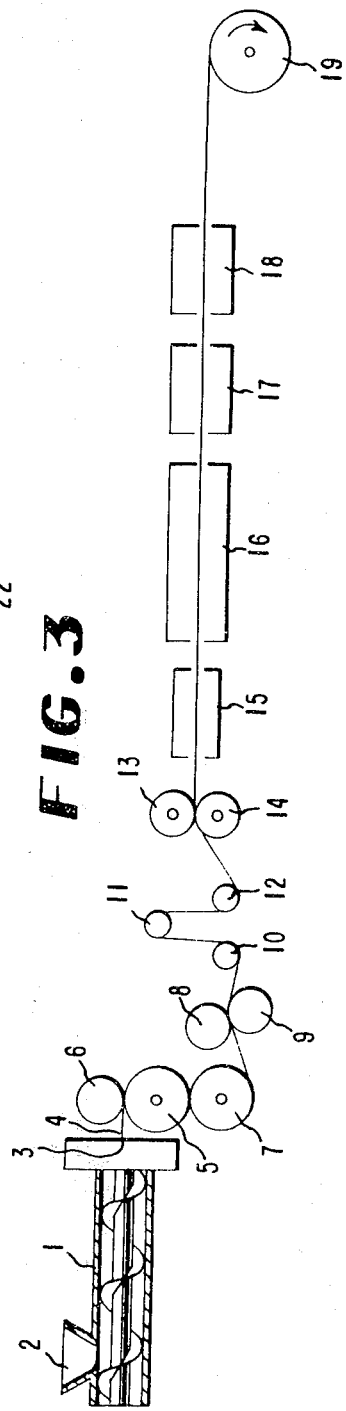

Referring to FIG. 3, the ingredients, namely about a 98/2 weight percent copolymer of ethylene/octene units having a density of 0.956 g./cc. and a crystallinity of about 71%, typically in the form of pellets, 35 weight percent of Englehard ASP-400 calcined kaolin clay filler having an average particle size of 5.5 microns and adjuvants, if desired, are added to extruder 1 through hopper 2 wherein the ingredients are mechanically melt-blended. In mechanically melt-blending the ingredients, caution must be taken not to shear the ingredients beyond a point where the terminal heat generated by the shearing action of the mechanical melt-blending becomes great enough to degrade the polymer. The melt is then extruded through a slot die 3 into a film 4. The die opening is typically about 50 mils in thickness and the film exiting the die is drawn down to about 35–40 mils thick and at a temperature of about 240°C.

The film is extruded onto a casting wheel 5 maintained at a temperature of about 85° to 90°C. and doctored on the casting wheel by doctor roll 6 maintained at a temperature of about 80°–95°C. The doctor roll assists in distributing the polymer across the width of the film providing a uniformly gauged film and also assists in cooling the film to provide form stability. In extruding the polymer melt into the nip of rolls 5 and 6, caution must be taken to have the film temperature at approximately 155°–165°C. If the film is hotter than 165°C., the melt will stick to the chill roll and if the film is cooler than 155°C., air bubbles tend to form between the chill roll and the film and in either event the surface of the film will become damaged.

The film leaves casting wheel 5 at a temperature of about 130° to 135°C. and passes onto roll 7 maintained at a temperature of about 125° to 130°C., cooling the film about 5°C. to a temperature of about 125° to 130°C., i.e., the mechanical orientation temperature of the film, that is between the line-drawing temperature and the polymer-melting temperature. The film is now stretched about 3.5–7 times its original length in the machine direction, i.e., the longitudinal direction of the film. Stretching is accomplished by passing the film through a set of nip rolls 8 and 9, over idler rolls 10, 11 and 12 and through nip rolls 13 and 14. Nip rolls 13 and 14 are driven at a peripheral speed that is 3.5–7 times faster than the peripheral speed of nip rolls 8 and 9 with the major portion of the stretching taking place between the nip rolls 8 and 9 and roll 10.

During longitudinal stretching, the film cools about 15°–30°C.; therefore, it is necessary to reheat the film to a temperature of 125° to 130°C. before stretching in the transverse direction. Accordingly, the film leaves drive rolls 13 and 14 and enters heating chamber 15 where the film is reheated to 125° to 130°C. The film is then directed into means 16 for transversely stretching the film, in a tenter frame, wherein the film is stretched 3.5 to 7 times its original width in the transverse direction.

After biaxial stretching is complete, the film can optionally be heat-set in heating chamber 17, cooled to room temperature in cooling chamber 18 and wound on wind-up roll 19 for use.

The following Examples further illustrate this invention wherein all parts, percentages and ratios are based on weight unless otherwise indicated. As used therein, weight percent filler is based on total weight of polymer and filler.

EXAMPLES 1 AND 2

1. A 98/2 weight percent ethylene/octene polymer having a density of 0.956 g./cc. corresponding to a crystallinity of about 71%, is melt-blended with about 35 weight percent of Englehard ASP-400 calcined kaolin clay having an average particle size of about 5.5 microns. The blend has an elongation of about 1050% up to about 2400% at a temperature between the line-drawing temperature of 121°C. and the melting temperature of about 131°C. of the polymer. The melt blend is extruded through a 12-inch die having a 50-mil die opening at 238°C. melt temperature and electrostatically pinned to a casting drum whose temperature is controlled at 79°C. and having a tangential velocity of 4.5 ft./min. The 40- to 45-mil case sheet leaves the quench drum at a temperature of 124°C., is reheated by a heated slow nip (tangential velocity = 4.5 ft./min.) whose temperature is held at 127°C. The cast sheet is then MD stretched 4.5 times between the slow nip and cooled idler rolls in a distance of less than ½ inch. The stretching force is provided by a nip moving 4.5 times the speed of the slow nip. The film is cooled to room temperature and then TD stretched 5.5 times in a tenter frame at 8 ft./min. using a pre-heat temperature of 130°C., stretch temperature of 128°C., and a heat-set temperature of 129°C. The film is cooled to room temperature and tested. Properties of this film are given in Table 1.

2. A polypropylene having a density of about 0.910 and a crystallinity of about 71% at room temperature is melt-blended with about 35 weight percent of Englehard ASP-400 calcined kaolin clay. The blend has an elongation of at least 2000% or greater between the polymer line-drawing temperature of 140°C. and the polymer melting temperature of 168°C. The melt blend is extruded through a 12-inch die having a 50-mil die opening at 226°C. melt temperature and electrostatically pinned to a casting drum whose temperature is 89°C. and tangential velocity 4.5 ft./min. The 40- to 45-mil cast sheet leaves the quench roll at 131°C., is reheated to 146°–147°C. by a heated slow roll (tangential velocity is 4.5 ft./min.) whose temperature is held at 158°C. The cast sheet is then MD stretched 4.5 times between a slow nip and cooled idler rolls in a distance of less than ½ inch. The stretching force is provided by a nip moving 4.5 times the speed of the slow nip. The film is cooled to room temperature and then TD stretched 5.5 times in a tenter frame using a preheat temperature of 156°C., stretch temperature of 150°C. and a heat-set temperature of 153°C. The film is then cooled and tested. Properties of this film are given in Table I.

TABLE I

Filled-Stretched Film Properties

| | Example 1 | Example 2 |
|---|---|---|
| Thickness, mils | 4.3 | 3.6 |
| Modulus, Kpsi (MD/TD) | 126/152 | 115/193 |
| Elongation, % (MD/TD) | 30/26 | 52/16 |
| Tensile Strength, Kpsi (MD/TD) | 4.9/4.6 | 3.8/8.1 |
| Tear Initiation, g/mil (MD/TD) | 88/110 | 158/125 |
| Tear Propagation, g/mil (MD/TD) | 2.8/3.9 | 4.6/3.1 |
| Opacity, % | 94 | 87 |
| Density, g/cc | 0.468 | 0.510 |
| Voids, % | 61 | 56 |
| Mullen Burst, lbs./3.0 mil | 40 | 40 |
| $O_2$ Permeability, cc/100 in.$^2$/ 24 hrs./atmosphere | $1.5 \times 10^6$ | $2.9 \times 10^4$ |
| Clark Stiffness (MD/TD) | 30/26 | 27/43 |
| Number of surface ruptures/sq. mm | 32 | 40 |

EXAMPLE 3

A polymer-filler composition is prepared in the same manner as described in Example 1 and melt-pressed into a 50-mil-thick sheet on a Watson-Stillman press. The 50-mil-thick film is stretched in the first direction 4.5 times its original forming dimension at a rate of 42,000% per minute at 128°–129°C. About 1.25 seconds thereafter the film is stretched in a perpendicular direction to the first direction of stretch about 5.5 times the original forming dimensions at a rate of 54,000% per minute at a temperature of 128°–129°C.

During stretching, the sample is restrained so that necking is not permitted. The final film is cooled, tested and exhibits the following properties:

| | |
|---|---|
| opacity | - 89% |
| density | - 0.648 g/cc. |
| voids | - 46.5% |
| thickness | - 3.85 mils |
| modulus of elasticity | - 142 Kpsi (in 4.5 × stretch direction) |
| | - 192 Kpsi (in 5.5 × stretch direction) |
| elongation at break at 22°C. | - (in 4.5 × stretch direction) 57% |
| | - (in 5.5 × stretch direction) 25% |
| tear propagation strength | - 4.5 g. (in 4.5 × stretch direction) |
| | - 6.4 g. (in 5.5 × stretch direction) |
| oxygen permeability | - 1200 cc./100 sq.in./24 hrs./atmosphere/mil |
| number of surface ruptures | - 12 per square millimeter |

EXAMPLE 4

A polymer of ethylene/decene having a density of 0.963 g./cc. with a corresponding crystallinity of about 75% is melt-blended with 35 weight percent of Englehard ASP-400 uncalcined kaolin clay having an average particle size of 5.5 microns. The line-drawing temperature of the polymer is about 123°C., the melting point of the polymer is about 133°C. and the polymer-filled blend has an elongation of at least about 3,000% at a temperature between 125° and 127°C.

The polymer-filled blend is melt-pressed into a 50-mil-thick sheet on a Watson-Stillman press. The film is then sequentially stretched about 4.5 times and 5.5 times in mutually perpendicular directions at a temperature of about 128°–130°C. The film is thereafter cooled and tested exhibiting the following properties: opacity = 98%; density = 0.44 grams per cc.; thickness = 6.7 mils; modulus of elasticity = 112 Kpsi (in 4.5 × stretch direction), 198 Kpsi (in 5.5 × stretch direction); elongation at break at 22°C. = 58% (in 4.5 × stretch direction), 17% (in 5.5 × stretch direction); tensile strength = 5 Kpsi (in 4.5 × stretch direction), 10.5 Kpsi (in 5.5 × stretch direction); oxygen permeability = 2.01 × 10⁵ cc./100 sq.in./24 hrs./atmosphere/mil; number of surface ruptures = about 30/sq.mm.; and percent voids = 63%.

EXAMPLE 5

An ethylene/octene polymer as described in Example 1 is melt-blended with 50 weight percent calcined Englehard ASP-400 kaolin clay having an average particle size of 5.5 microns. The blend has an elongation of at least 1000% between the line-drawing temperature of the polymer and the melting point of the polymer. The melt-blend is extruded through a die having an opening of about 50 mils onto a quench drum having a surface temperature of about 80°C. The film is thereafter simultaneously stretched 4.75 times and 6 times its original forming dimensions in mutually perpendicular directions at a temperature of about 128°C. The film is cooled to room temperature and tested. The test results show the following properties: opacity = 90.5%; film thickness = 2.5 mils; density = 0.488 g./cc.; percent voids = 64.6%; elongation at break = 10.3% (in 4.75 × stretch direction), 10.6% (in 6 × stretch direction); oxygen permeability = 2.22 × 10⁶ cc./100 sq.in./24 hrs./atmosphere/mil; number of surface ruptures = 15 sq.mm.; Mullen burst strength = 32 pounds/2.5 mil; Clark stiffness = 13 (in 4.75 × stretch direction), 3 (in 6 × stretch direction).

Note that the high degree of filler loading, i.e., 50 weight percent, results in a relatively high degree of voiding, i.e., 64.6%, and a relatively high oxygen permeability, i.e., 2.22 × 10⁶ cc./100 sq.in./24 hrs./atmosphere/mil.

EXAMPLE 6

Polyethylene having a density of 0.968 g./cc. with a corresponding crystallinity of 78% is melt-blended with 35 weight percent, based on the blend, of an Englehard ASP-400 clay filler having an average particle size of 5.5 microns. The polymer-filled blend has an elongation of at least 1000% between the line-drawing temperature and the melting point of the polymer. A 50-mil-thick film is made on a Watson-Stillman press, cooled to room temperature and sequentially stretched. The film is first stretched 4.5 times its original forming direction at a temperature of about 128°C.; cooled to room temperature and stretched 5.5 times its original forming dimension in a mutually perpendicular direction at a temperature of about 128°C. The film is cooled to room temperature, tested and exhibits the following properties: opacity = 95.5%; thickness = 3.2 mils; density = 0.62 g./cc; voids = 47%; modulus of elasticity = 109 Kpsi (in 4.5 × stretch direction), 223 Kpsi (in 5.5 × stretch direction), elongation at break at 22°C. = 44% (in 4.5 × stretch direction), 20% (in 5.5 × stretch direction); tensile strength = 4.8 Kpsi (in 4.5 × stretch direction), 11.5 Kpsi (in 5.5 × stretch direction); oxygen permeability = 1.12 × 10⁶ cc./100 sq.in./24 hrs./atmosphere/mil; number of surface ruptures = 35/sq. mm.

EXAMPLE 7

The polymer of ethylene/octene as described in Example 1 is melt-blended with 35 weight percent, based on the blend, of Englehard AF-951 calcined clay having an average particle size of about 0.5 microns. The melt-blend is extruded through a die having an opening of about 50 mils onto a quench drum having an outer surface temperature of about 78°C. With the film at an initial stretch temperature of 126°C., it is stretched 4.3 times its original forming dimensions in the machine direction cooled to room temperature followed by stretching 5.5 times its original forming dimension in the transverse direction at a temperature of about 129°C. The film was then cooled to room temperature, tested and exhibited the following properties: film thickness = 3.7 mils; modulus of elasticity = 123 Kpsi (MD), 138 Kpsi (TD); elongation at break at 22°C. = 41% (MD), 12% (TD); tensile strength = 3.5 Kpsi (MD), 3.9 Kpsi (TD); Mullen burst = 24 lbs./3.7 mils; tear propagation strength = 2.2 g./mil (MD), 3.7 g./mil (TD); opacity = 93%; density = 0.486 g./cc.; voids = 60%; Clark Stiffness = 30 (MD), 35 (TD); oxygen permeability 2.26 × 10⁷ cc./100 sq.in./24 hrs./atmosphere/mil; number of surface ruptures = 6/sq.mm.

Note that the relatively low temperature during the first direction of stretch and the cooling between the first and second stretching steps result in a relatively high degree of voiding, i.e., 60%, with a relatively high oxygen permeability, i.e., 2.26 × 10⁷ cc./100 sq.in./24 hrs./atmosphere/mil.

We claim:

1. A process for preparing a thermoplastic film having a void content of at least about 30 to 70%, a fibrous surface having about 2 to 40 surface ruptures per square millimeter, and an oxygen permeability of about 900 to 10,000,000 cc./100 sq. in./24 hrs./atmos./mil consisting essentially of:
   1. melt-blending
      a. a polymer taken from the group consisting of homopolymers, copolymers, or blends thereof of α-monoolefins having two to ten carbon atoms, said polymers having a crystallinity of at least about 60% at room temperature, and
      b. about 26 to 50 weight percent of an inert inorganic filler based on the weight of the polymer and filler, said filler having an average particle size of about 0.3 to 8 microns,
      wherein the blend has an elongation of at least 1000% at a temperature within the range which is above the line-drawing temperature and below the melting temperature of the polymer;
   2. forming a film from the melt blend;
   3. cooling the film to a temperature below the melting point;
   4. sequentially stretching the film at least about two times its original forming dimensions in mutually perpendicular directions with the temperature of the film during stretching within the temperature range which is above the line-drawing temperature and below the melting temperature of the polymer, until the film has at least about 30% voids, the film temperature during the first direction of stretch being controlled to provide a desired oxygen permeability in the final film product according to the following relationship $$\text{Log } P = C_1 \text{ Log } T + C_2$$

where

P = oxygen permeability of the final product,
C₁ } = experimentally determined constants related to film composition and process parameters
C₂ } used to make the film, and
T = temperature of the film during the first direction of stretch, and 5. cooling the film to room temperature.

2. The process of claim 1 wherein the thermoplastic film is stretched about three to seven times its original forming dimensions in mutually perpendicular directions until the film has about 40 to 70% voids.

3. The process of claim 1 wherein the film is stretched to a final thickness of about 0.5 to 7.0 mils with a TAPPI opacity of at least about 85%.

4. The process of claim 1 wherein the thermoplastic film is prepared from an ethylene/octene copolymer and said film is stretched with the film at a temperature between about 126° and 128°C. during the first direction of stretch and a temperature between about 129° and 130°C. during the second direction of stretch.

5. The process of claim 1 wherein the thermoplastic film is prepared from polypropylene and said film is stretched with the film temperature between about 142° and 153°C. during the first direction of stretch and a temperature between about 153° and 165°C. during the second direction of stretch.

* * * * *